UNITED STATES PATENT OFFICE.

COLIN G. FINK, OF SCHENECTADY, NEW YORK, ASSIGNOR TO GENERAL ELECTRIC COMPANY, A CORPORATION OF NEW YORK.

PROCESS OF REDUCING METALS.

1,119,588.  Specification of Letters Patent.  Patented Dec. 1, 1914.

No Drawing.  Application filed February 9, 1910.  Serial No. 542,909.

*To all whom it may concern:*

Be it known that I, COLIN G. FINK, a citizen of the United States, residing at Schenectady, county of Schenectady, State of New York, have invented certain new and useful Improvements in Processes of Reducing Metals, of which the following is a specification.

My invention relates to the reduction of difficultly reducible, or "rebellious" ores, such as ores containing a metalloid as arsenic, sulfur, phosphorus and similar elements.

According to my invention these ores are mixed with a reaction mixture which upon heating yields a metal or metals, whose heat of combination with the non-metallic elements contained in the ore is higher than that of the metal combined with said elements in the ore, in other words, a reducing metal whose affinity for the non-metallic elements is greater than that of the metal combined with them in the ore. For example, a mixture of oxid and carbid of an energetic reducing metal such as calcium, strontium, barium, aluminium, etc., is added to the ore. Upon heating, the oxid and the carbid interact setting free the reducing metal, which in turn combines with the arsenic, sulfur, phosphorus or other non-metallic element of the ore. This reaction is preferably carried on in a more or less complete vacuum. If, for example, a mixture of calcium oxid and calcium carbid is employed, according to my invention to reduce a compound such as smaltite, the arsenid of cobalt, the following reactions occur: The calcium oxid and carbid interact according to the following equation:

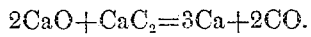

The liberated metallic calcium combines with the arsenic to form calcium arsenid according to the following reaction:

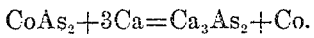

The calcium arsenid separates from the reduced cobalt as a slag. Oxids and carbids of various earth metals or alkaline-earth metals can be used in this manner, the most suitable reducing metal depending upon the character of the ore to be reduced. I consider the calcium oxid, calcium carbid mixture as typical and in case of most ores, I consider calcium as the preferable reducing metal. I wish it to be understood, however, that other mixtures such as oxid and carbid of aluminium can be employed in a similar manner and these various metals are to be considered as the equivalent of calcium.

In carrying out the above process to the reduction of an ore such as smaltite the ore is intimately mixed in powdered form with an amount of powdered oxid and carbid of calcium, for example, in excess to that required theoretically to yield sufficient reducing metal to combine with the arsenic. If desired, the carbonate of calcium can be used instead of the oxid, the carbonate decomposing to yield the oxid. The mixture is placed in a suitable container and heated in a vacuum furnace. After heating from one to two hours, the temperature of the furnace going as high as 1500° C., I find it desirable to maintain the vacuum in the furnace as complete as possible, as the high temperature required for most reactions the energetic reducing metals mentioned above are very chemically active, and tend to combine with the gases in the furnace to form hydrids, nitrids, etc.

While I have described my invention with especial reference to the reduction of an arsenid, I wish it to be understood, that it has general application to the reduction of ores, and compounds of metallic and non-metallic elements.

What I claim as new and desire to secure by Letters Patent of the United States, is,—

1. The process of reducing smaltite which consists in mixing the same in powdered form with powdered calcium oxid and calcium carbid and heating the mixture to an elevated temperature.

2. The process of reducing smaltite which consists in mixing the same in powdered form with powdered calcium oxid and calcium carbid and heating the mixture to an elevated temperature in an attenuated atmosphere.

3. The process of reducing a compound of arsenic and a metal which consists in intimately mixing the same with calcium carbid and calcium oxid and heating said mixture to the reaction temperature.

In witness whereof, I have hereunto set my hand this 8th day of February, 1910.

COLIN G. FINK.

Witnesses:
 BENJAMIN B. HULL,
 HELEN ORFORD.